United States Patent [19]

Hawtree et al.

[11] 3,916,723

[45] Nov. 4, 1975

[54] TRANSMISSION MECHANISMS

[75] Inventors: George Hawtree, Llanelli; Edgar Hoyle, Mount Pleasant, both of Wales

[73] Assignee: Bowden Controls Limited, Llanelli, Wales

[22] Filed: Jan. 17, 1973

[21] Appl. No.: 324,426

[30] Foreign Application Priority Data
Jan. 26, 1972 United Kingdom................. 3727/72

[52] U.S. Cl................ 74/501 R; 74/501 P; 138/131
[51] Int. Cl.²..................... F16C 01/20; F16C 01/06
[58] Field of Search........... 138/129, 131, 134, 135, 138/137; 74/501 P, 502; 248/56; 285/238, 285/255; 85/80; 151/7

[56] References Cited
UNITED STATES PATENTS

| | | | |
|---|---|---|---|
| 1,941,151 | 12/1933 | Nigro | 138/134 |
| 2,083,937 | 6/1937 | Begg | 74/501 P |
| 2,092,898 | 9/1937 | Tondeur | 138/134 X |
| 2,424,757 | 7/1947 | Klumpp, Jr. | 74/501 P |
| 2,732,861 | 1/1956 | Gilmore | 138/131 X |
| 2,850,915 | 9/1958 | Brutz | 138/131 X |
| 2,954,248 | 9/1960 | Brickman | 74/501 P |
| 3,030,997 | 4/1962 | Collins | 151/7 |
| 3,289,491 | 12/1966 | Conrad | 74/501 P |
| 3,320,665 | 5/1967 | Morse | 138/133 X |
| 3,479,903 | 11/1969 | Hermanson et al. | 74/502 |
| 3,508,593 | 4/1970 | Gill | 151/7 X |
| 3,572,159 | 3/1971 | Tschanz | 74/501 P |

FOREIGN PATENTS OR APPLICATIONS

| | | | |
|---|---|---|---|
| 1,906,635 | 7/1969 | Germany | 74/501 P |

*Primary Examiner*—Richard C. Queisser
*Assistant Examiner*—Daniel M. Yasich
*Attorney, Agent, or Firm*—Cushman, Darby & Cushman

[57] ABSTRACT

A flexible transmission mechanism of the kind in which a core member extends longitudinally within a flexible conduit for relative displacement between the core and the conduit for power transmission, has its conduit at least in part of wire coiled to form an external screw thread and means for fixing or serving as an abutment for the conduit are screwed onto the conduit. Advantageously, a projecting end portion of the conduit enclosing a corresponding end part of the core connectible to an operating or operated part is capable of flexure with the core from a fixing position and the said means can be adjusted along the screw conduit to determine the length of the projecting part of the conduit. A rigid rod may be fixed to one or each end of the core and not leave the conduit or prevent the aforesaid flexure. The said means may take the form of a plastics nut or nuts. The wire, or one wire of the conduit may be of triangulated section the flanks and apex of which may be rounded.

9 Claims, 13 Drawing Figures

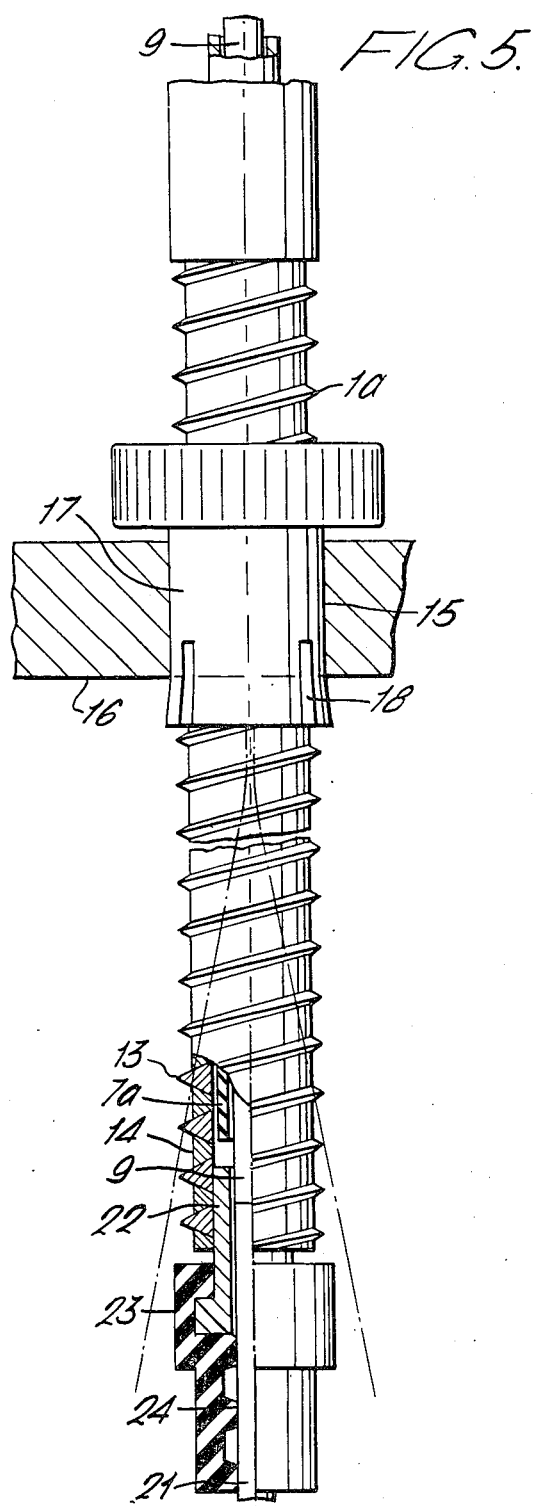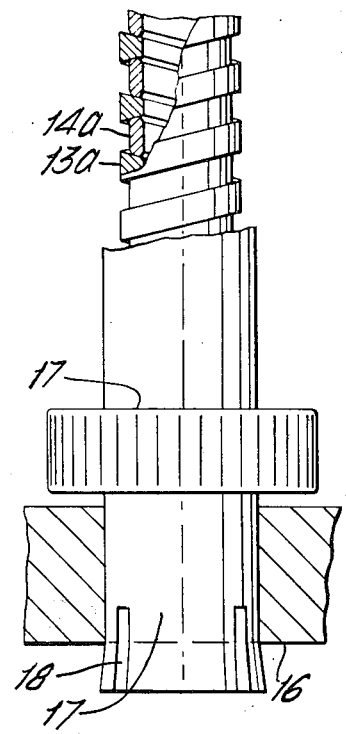

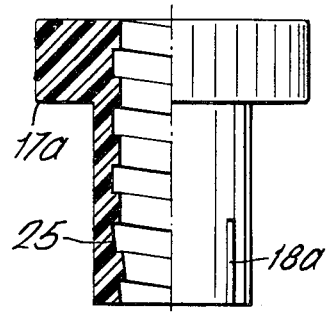
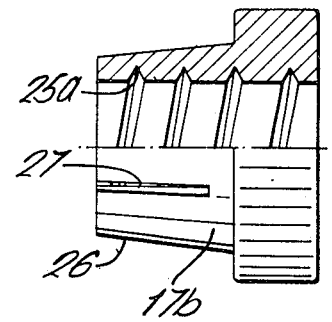
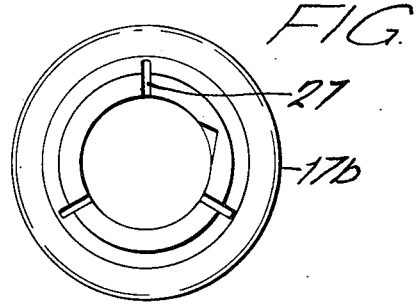
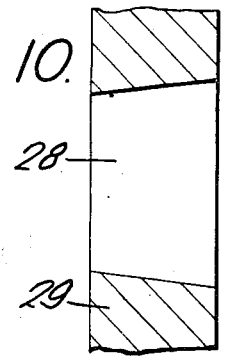
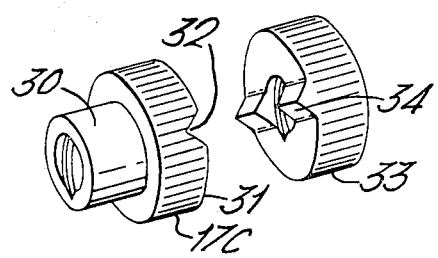
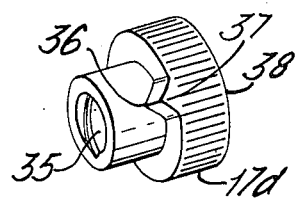
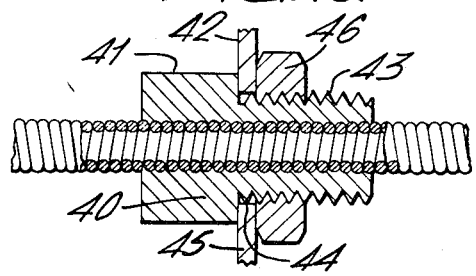

TRANSMISSION MECHANISMS

The present invention relates to flexible transmission mechanisms of the kind in which a flexible longitudinal core member extends lengthwise within a flexible conduit formed of one or more helically wound wires for relative longitudinal displacement between the core and the conduit for power transmission by remote control.

According to the present invention the said conduit forms a screw and means for securing the conduit is screwed thereon.

Preferably the said securing means comprise at least one internally screw-threaded member of plastics material. The conduit may be formed of one or more metal wires wound with contiguous convolutions.

The said member may be elastically deformable for retention in an aperture in a mount panel. It may have a conical portion which is slit or slotted longitudinally so that it can be elastically closed in to grip the conduit when forced into an appropriate aperture in a mount panel. Alternatively, it may be slitted or slotted longitudinally so that it can be elastically contracted radially by insertion through an appropriate aperture in a mount panel and expand behind the panel to retain it against axial withdrawal from the panel.

According to another embodiment, the said member is longitudinally slitted or slotted and is internally conical or has an internally conical portion so that in being fitted its conical portion grips the screw thread of the conduit.

According to another embodiment the conduit is engaged by, and secured or adapted to be secured to, a mount panel, by a plastics nut or nuts.

The internal thread of the said member or of the nut or each nut may be formed so as when screwed tight to bind on the conduit, e.g., the internal thread may be formed of greater pitch than that of the thread of the conduit and when screwed home ensure a firm engagement of the nut with the conduit which will render the fixed setting capable of withstanding vibratory forces. Such nuts can be finger-operated.

According to a further embodiment the fixing means comprises a headed internally screw-threaded member which has an externally threaded stem portion to be passed through an aperture in the panel and engaged by a nut for clamping the head of the said member against the panel. These components may be made of plastics material.

The conduit, at least in part may be formed of wire of triangulated section so as to form a screw thread wholly or locally on the exterior of the conduit, e.g., a V-thread preferably making an apex angle of not more than 70°. The flanks and/or apex of the section may be rounded. The base of the section may be rounded or semi-circular. Alternatively, the conduit, at least in part, may be formed of interwound wires the sections of which so differ from one wire to the other or another that at the exterior of the conduit there is a greater outward radial projection at alternate convolutions than at intervening convolutions so that the wire having a greater diameter forms an external screw thread and the wire having a lesser diameter forms the root portion of the thread, integral with the conduit. The conduit may for example be formed of closely interwound wires, as in the case of conduits known as 'Bowdenex' in which the wires are of such cross-section that the conduit does not open between convolutions on the outer side of the bend when curved and a substantially constant axial length is maintained.

In conjunction with conventional conduits of transmission mechanisms of the kind described, a rigid, usually metal, screw has to be fixed to the or each end of the conduit to be used with nuts for adjustment purposes.

The mechanism according to the invention, according to a feature thereof, can be constructed so that a freely projecting end portion of the conduit enclosing a corresponding end portion of the core connected to the operating or operated part, is capable of flexing with the core from the fixing position, the conduit end forming a flexible screw adjustable in length.

The mechanism can be constructed for pull or push on the cable and for the latter purpose, or where both push and pull are provided for, a rigid rod may be fixed to one or each end of the core and the operating or operated part pivotally connected to the other end of the rod, the end of the rod attached to the core remaining within the end portion of the conduit during the allowable operational movement.

Each end rod may be formed with an end socket to receive the end of the cable. Where the core, e.g., cable, is provided with an outer layer or sheath of plastics material, such as Nylon, this layer may be cut off or foreshortened over an end length thereof and the rod may be of substantially the same diameter as the overall diameter of the cable including the layer or sheath, e.g., so that the socketed end of the rod reaches the end of the layer or sheath and the overall diameter of the covered length of cable and the rod remains substantially the same. Both rod and cable should make a good operative fit in the conduit but no part of the cable bared or not should be exposed beyond the end of the conduit.

The rod may be swaged onto the cable, e.g., by a hexagonal swage, and the outer circle containing the corners of the hexagon may be of substantially the same diameter as that of the covered cable.

The cable may be surrounded by a relatively fine pitch closed coiled strip (the major length of the strip cross section extending in the axial direction of the transmission), and a covering layer or sheath of plastics may be provided around this coiled strip. The coiled strip may also be foreshortened and the rod fixed around the cable.

In order that the invention may be the more clearly understood, reference is hereinafter made to the accompanying drawings which illustrate embodiments of the invention by way of example.

FIG. 1 shows one embodiment of the invention by way of example, and

FIG. 2 an enlarged part section of the conduit.

FIG. 5 shows another constructional embodiment of the invention incorporating such a conduit;

FIG. 6 shows another form of screw conduit.

FIG. 7 shows a modified form of conduit-fixing nut.

FIGS. 8 and 9 show another form of conduit fixing nut and

FIG. 10 shows a mount plate or panel to receive the said nut.

FIGS. 11 and 12 show further modifications.

FIG. 13 shows another embodiment.

Figure 1:
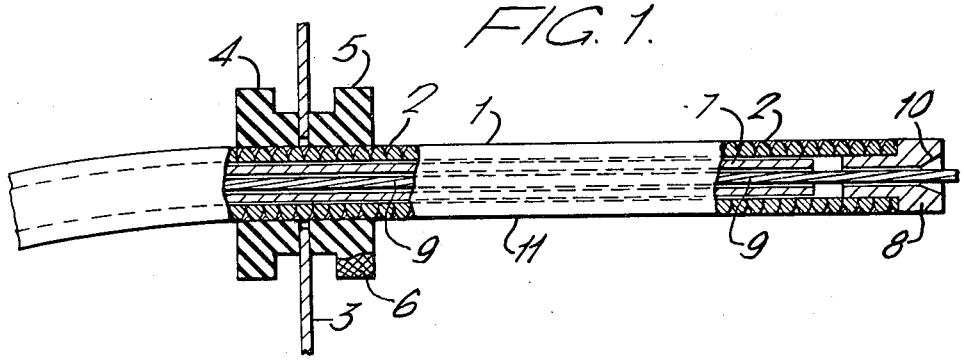
Figure 2:
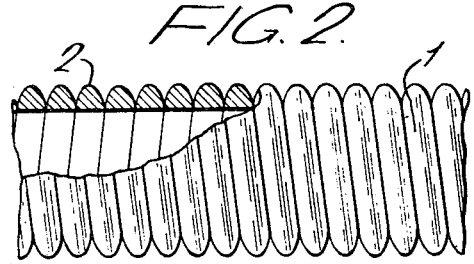
Figure 3:
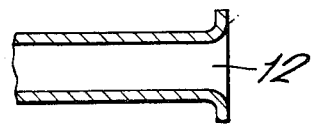
FIG. 3 is a detailed view.

Referring to FIGS. 1 to 3, the conduit 1 is formed of a wire of generally triangular section wound to a helix with contacting or closely adjacent convolutions to provide the threads 2 to form a screw, the threads in the illustrated example being of a depth equal to the radial distance between the inside and outside of the coil.

FIG. 1 shows the operating end of the conduit passing through a mount panel 3 and secured to the panel by means of nuts 4, 5 of a suitable thermoplastics material, e.g. nylon. Such nuts, especially of a pitch somewhat different from e.g., greater than that of the screw, when screwed tight against the panel can take a tight resilient bite on the conduit and secure it effectively against loosening by vibration. The nuts may be knurled as indicated at 6 and finger-operated to secure the conduit in relation to the panel.

A thermoplastic liner tube 7, e.g., of Nylon, is located within the conduit to have some axial freedom relatively to the conduit. Its axial movement is limited by means of plugs 8, e.g. of a thermoplastics material such as nylon.

A core member 9, in the form of a cable, passes through the liner tube 7 and the end thereof extending beyond the plug can be appropriately connected to an operating lever for axial pull on the cable for power transmission in well known manner.

The bore of the plug 8 may be flared at the end 10 remote from the end of the conduit.

The freely projecting end portion 11 of the conduit forms a flexible adjusting screw capable of flexure from the position of fixation of the conduit to conform to flexure of the cable and enable the connection to the lever to be by way of a gentle curve and to accommodate any malalignment. The extent of projection may be readily adjusted with the aid of the nuts.

The liner tube 7 in the example shown in FIG. 1 ends within the conduit with some clearance between it and the plugs 8 at least when the mechanism is in a curved condition.

However, as shown in FIG. 3, the ends 12 of the liner tube may be flared, e.g., by a hot tool, to provide end stops to co-operate with the ends of the conduit, when this is in a strongly curved condition.

The liner may alternatively be provided with stops of any appropriate form, e.g., collars or the like secured to the ends thereof.

The remote end of the transmission mechanism may be of a similar form to that described and shown.

The embodiment just described is suitable for pull operation and comprises a single wire conduit, but the conduit may be of interwound wires and used for push-pull operation.

Figure 4:
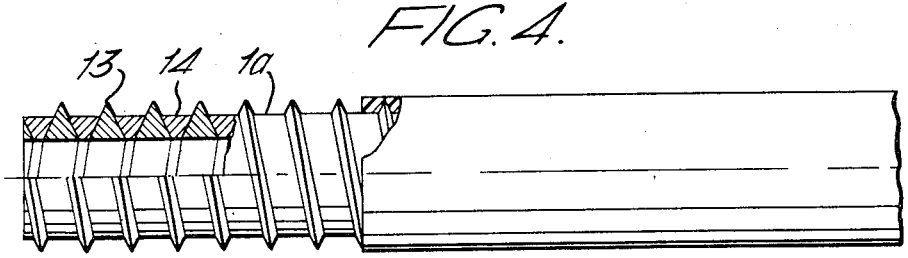
FIG. 4, shows another form of screw conduit.

The conduit 1a, FIGS. 4 and 5, is formed of interwound wires 13, 14 such as to provide an external screw thread. The wire 13 is of triangular section wound base inwards and the wire 14 is of truncated triangular section wound base outwards so that the section of wire 13 extends radially outwards beyond the section of wire 14 forming the root portion of the thread. The corners of the wire may be appropriately rounded.

The conduit is held in an aperture 15 in a panel 16 by means of a securing means in the form of plastic nut 17 which is screwed on the conduit and is slotted at 18 to expand behind the panel. The conduit need not project through the securing nut but may terminate within such nut (see FIG. 6). The latter figure shows a modified conduit in which one wire 13a is of truncated triangular form wound with base outward and the other wire 14a is of oval section or of rectangular section with rounded side edges.

The cable in FIG. 5 has an end rod 21 fixed thereto, the rod being connectible to the end of an operating lever so that the cable can be satisfactorily operated by push or pull. The cable end may be fitted into an end socket in the rod 21 and the end of the rod swaged around the cable, e.g., with an hexagonal swage.

The conduit is provided with a liner tube (7a) of plastics material, e.g., nylon, and the cable is preferably covered with a deposit of plastics such as polytetrafluoroethylene, or of nylon if the liner tube is of a plastics of a different, e.g., less compression resistant, material, such as polyethylene, than the cable covering. A flat wire may be wound round the cable and covered by a plastics.

A plug 22 e.g., of plastics material such as nylon, is force fitted into the conduit and a resilient, e.g., rubber boot 23 secured to the plug, e.g., by a collar on the plug engaging a groove in the boot or vice versa, and sealingly engaging the rod at 24.

FIG. 7 shows another form of plastics nut (17a) which is slotted at 18a in two or more regions so that it can be secured to the panel, the internally screwed wall being preferably tapered at 25 for promoting grip of the conduit.

FIGS. 8 and 9 show a modified plastics nut 17b which is internally threaded at 25a and formed with a conical spigot portion 26 with a number of axially extending slots 27 to enable it to grip in a tapering hole 28 in a panel 29 (FIG. 10), and grip the conduit.

The conical spigot may be forced into the tapering hole in either direction depending upon whether, the mechanism is intended for push or pull operation.

Another form of nut (17c) is shown in FIG. 11 which is internally screw-threaded to co-operate with the conduit. It has a spigot portion 30 to fit in a cylindrical hole in the panel. The end face 31 remote from the spigot is V-notched at 32 and a lock nut element 33 has a co-operating V projection 34, so that the nut 17c may be locked firmly on the conduit. Another form of nut (17d) is shown in FIG. 12, having an internally screwed sleeve 35 with end notches 36 engageable by V projections 37 on an internally screw-threaded locking ring 38.

The conduit as a whole need not be screw-threaded but only the portion or portions so formed which are to be engaged by the internally threaded member or members.

In the embodiment shown in FIG. 13, the member 40 is screwed into the single-wire conduit so that the head 41 thereof abuts one side of the panel 42 and the stem portion 43 hereof passes through the aperture 44 in the panel 45 and is externally screw-threaded and engaged by a nut 46 which is tightened up to the other side of the panel.

What we claim is:

1. A flexible force-transmitting mechanism of the type comprising a flexible conduit, a core member movable within said conduit, and conduit securing means which is adjustable along the conduit; wherein at least part of the conduit is formed of closely helically interwound wires forming helices of different external diameters, thereby to give said conduit part the form of a male screw of which the thread is formed by one wire and the root portion thereof being formed by the other wire; wherein said thread-forming wire has a cross-section which tapers towards the axis of the conduit and said root-forming wire is of substantially flat elongated section with its major sectional dimension parallel with said axis so that said male screw has a groove of substantially dovetail section; said securing means comprising at least one female threaded plastics nut member having a portion which is externally tapered for wedging into an aperture in a plate-like fixture and which is axially slotted at positions angularly spaced about its axis whereby said externally tapered portion can be forced radially inwardly against said male screw under such wedge action.

2. A flexible force-transmitting mechanism of the type comprising:
   a flexible conduit formed of at least one helically wound wire;
   a core member movable within said conduit; and
   conduit securing means adjustable along said conduit;
   at least one portion of said conduit comprising a male screw having a thread with steep flanks via which axial reaction forces can be transmitted to said securing means, said conduit securing means having an axial bore extending entirely through it so as to permit said male screw portion to pass through it, the axial bore having a corresponding female thread portion of shorter axial length than said male screw portion for movable engagement with said male screw portion so as to transmit axial loads on the conduit to a fixed panel through said securing means, and for releasably fixing said conduit relative to said panel at any desired point along the length of said male screw portion, wherein said securing means further includes a nut member having a portion which is tapered towards its free end for wedging into an aperture in a plate-like fixture and is axially slotted to permit its radial contraction under such wedge action.

3. A flexible force-transmitting mechanism of the type comprising:
   a flexible conduit formed of closely helically interwound wires;
   a core member movable within said conduit; and
   conduit securing means adjustable along said conduit;
   at least a portion of said conduit comprising a male screw formed by said wires wound with helices of different external diameter, at least one of said wires forming the root of said male screw and at least another of said wires forming the thread of said male screw, said conduit securing means having an axial bore extending entirely through it so as to permit said male screw portion to pass through it, the axial bore having a corresponding female thread portion of shorter axial length than said male screw portion for movable engagement with said male screw portion so as to transmit axial loads on the conduit to a fixed panel through said securing means, and for releasably fixing said conduit relative to said panel at any desired point along the length of said male screw portion.

4. A flexible force-transmitting mechanism according to claim 3, wherein the said wires are of such cross-sections that when the said conduit part is flexed into a curve the wires do not separate at the outside of the curve.

5. A flexible force-transmitting mechanism according to claim 3, wherein said interwound wires are of different cross-sections and form helices of substantially the same internal diameter.

6. A flexible force-transmitting mechanism according to claim 3, wherein the cross-sections of said wires are such that said male screw has a thread with substantially flat flanks and a substantially flat root face, and said securing means comprises at least one plastics nut member having an elastically deformable portion for retention in an aperture in a panel-like fixture.

7. A flexible force-transmitting mechanism according to claim 3, wherein said securing means comprises a nut member having its thread formed to bind on said male screw.

8. A flexible force-transmitting mechanism according to claim 3, wherein said securing means comprises at least one nut member which has an externally tapered portion for wedging into an aperture in a panel-like fixture and which is longitudinally slotted so that it can be radially contracted onto said male screw under such wedge action.

9. A flexible force-transmitting mechanism as defined in claim 3 wherein said thread-forming wire has a cross-section which tapers towards the axis of the conduit and said root-forming wire is of substantially flat elongated section with its major sectional dimension parallel with said axis so that said male screw has a groove of substantially dovetail section.

* * * * *